Feb. 26, 1935.  H. E. SMYSER  1,992,248
HYDRAULIC TURBINE BEARING
Filed June 3, 1931  2 Sheets-Sheet 2

INVENTOR
HARRY E. SMYSER.
BY
ATTORNEY

Patented Feb. 26, 1935

1,992,248

UNITED STATES PATENT OFFICE 1,992,248

HYDRAULIC TURBINE BEARING

Harry E. Smyser, York, Pa., assignor to S. Morgan Smith Company, York, Pa., a corporation of Pennsylvania Application June 3, 1931, Serial No. 541,847

7 Claims. (Cl. 308—127)

This invention relates to improvements in hydraulic turbines.

An object of the invention is to provide an improved bearing for the runner shaft of hydraulic turbines.

Another object of the invention is to provide improved means for lubricating the runner shaft bearing of hydraulic turbines.

Another object of the invention is to provide an improved bearing for the runner shaft of hydraulic turbines in which the packing box associated with the bearing is so disposed as to be more accessible for inspection and adjustment than was heretofore possible with known constructions.

Another object of the invention is to provide an improved bearing of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Figure 1:
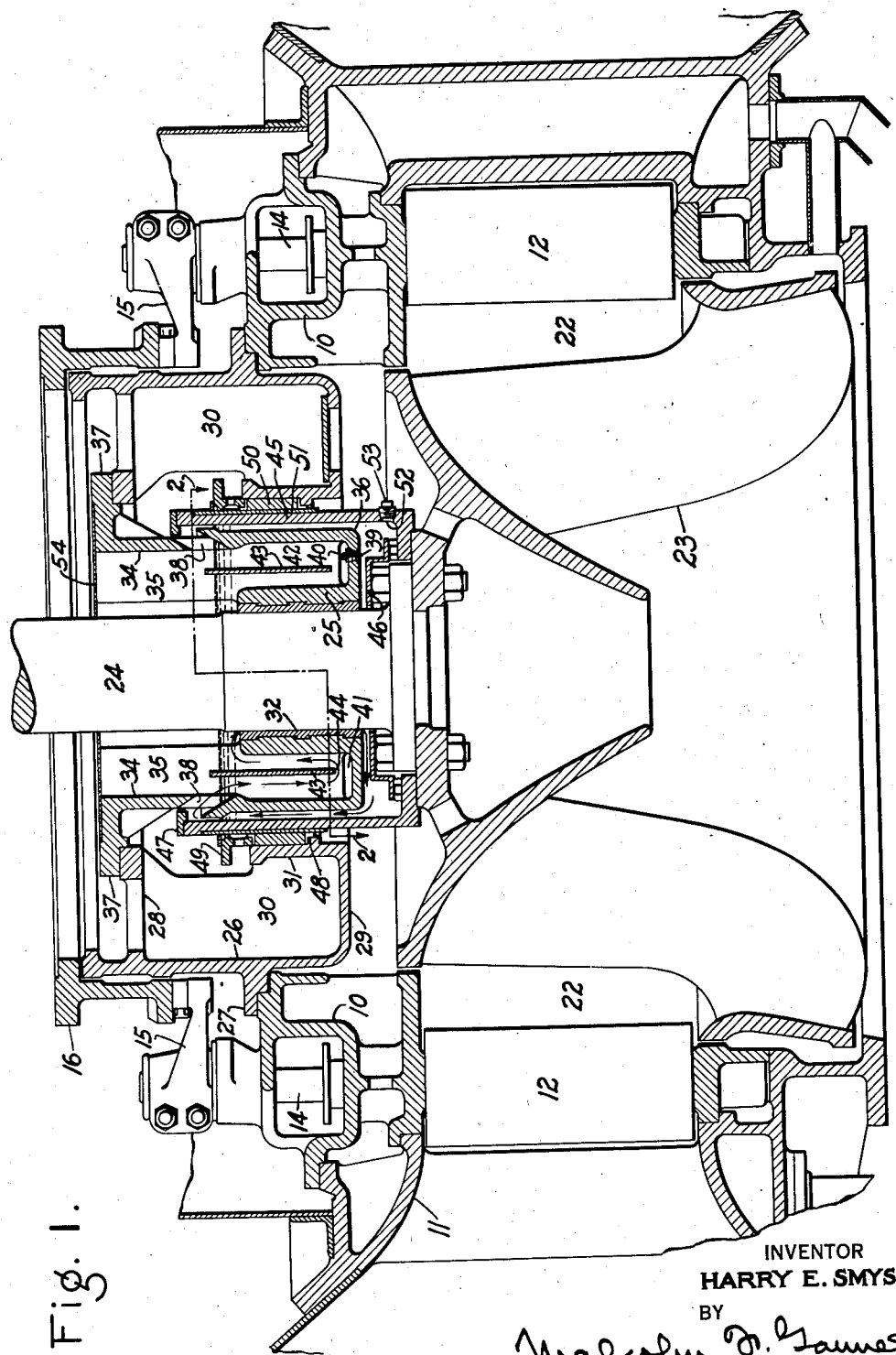
Figure 2:
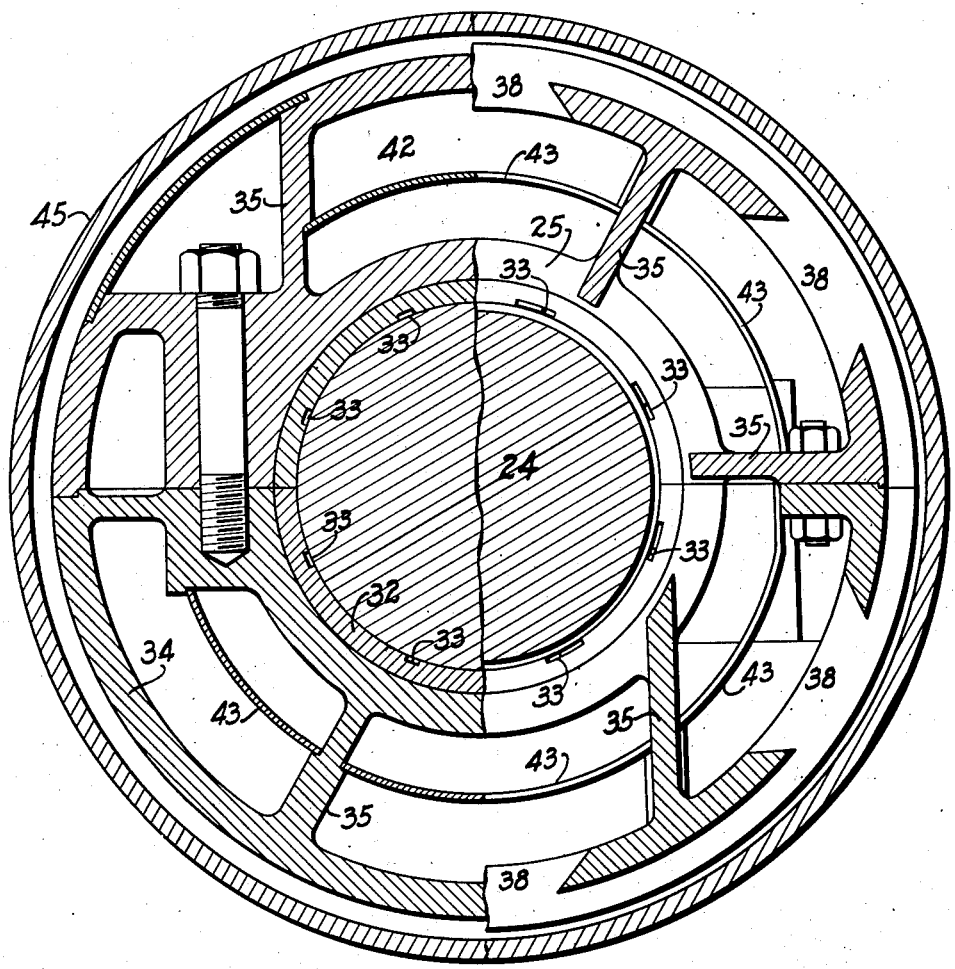

Figure 1 is a vertical section of a portion of a hydraulic turbine showing the application of my invention thereto; and Fig. 2 is a horizontal section taken on the line 2—2 of Fig. 1.

Referring to the drawings, the turbine comprises a casing composed of upper and lower sections 10 and 11 which forms a peripheral water inlet in which are mounted an annular series of wicket gates or guide vanes 12. The wicket gates are adapted to be rotated simultaneously into different angular positions to control the flow of water into the turbine in the usual manner and for this purpose the stems 14, which project upwardly from the wicket gates, are usually provided with gate operating arms 15 which are fixed to said stems and connected by links to the gate adjusting ring 16.

The casing section 11 is formed with an axially directed chamber 22 in which the runner 23 operates. The hub of the runner 23 is fixed to the lower end of a shaft 24 which is journalled in a suitable bearing 25.

For the purpose of supporting the bearing 25 I prefer to use a hollow cylindrical member or housing 26, which is fixed to the upper portion 10 of the casing. As shown clearly in Fig. 1 the housing 26 is formed with an external circumferential flange 27 which rests on a correspondingly formed portion of the casing section 10. The housing 26 is a size to snugly fit within the gate adjusting ring 16.

The housing 26 is formed with upper and lower inwardly projecting horizontal portions 28 and 29, which are connected by vertical webs 30. The portion 29 is formed with an upwardly extending portion 31 for a purpose to be hereinafter more fully described. If so desired, the housing 26 can be made from a single casting with the portions 27, 28, 29, 30 and 31 formed integral therewith.

The bearing 25 heretofore referred to, is formed with a central tubular portion, the inner surface of which is lined with Babbitt metal or other suitable bearing material 32. The Babbitt lining 32 is formed at suitable intervals with vertical grooves 33 (see Fig. 2). The grooves 33 extend the entire length of the tubular portion of the bearing so as to provide ducts or passageways for the oil, as will be hereinafter more fully described.

As shown in Fig. 2 the bearing 25 is preferably composed of two semi-circular sections which are suitably held together by bolts or other fastening means. It is desirable to make the bearing in sections so that the same can be assembled on the runner shaft 24, which shaft has, as shown in Fig. 1, a flange at its lower end for receiving the bolts which secure the shaft to the runner 23.

Surrounding the main shaft engaging portion of the bearing 25, and spaced a suitable distance therefrom, is a cylindrical wall 34. This wall is made a part of the bearing, being connected thereto by a plurality of vertical webs 35 and a bottom piece 36.

The wall 34 extends upwardly a considerable distance above the central portion of the bearing, said wall being formed with an outwardly projecting flange 37, which rests on and may be secured to, the correspondingly formed inner periphery of the portion 28 of the housing 26. At a point above the central portion of the bearing 25, the outer wall 34 is formed with a series of inclined and tapered openings 38, the purpose of which will be hereinafter more fully described. The wall 34 is thickened, as shown in the drawings at the point where the openings 38 are formed therein.

The bottom 36 of the bearing 25 is spaced a suitable distance above the lower end of the runner shaft 24, and an opening 39 is formed in the bottom of the bearing for the purpose of draining oil from the bearing. The opening 39 is normally closed by a screw threaded plug 40.

The vertical webs 35 divide the space within the outer wall 34 of the bearing into a plurality of chambers 42. However, as shown in Fig. 1 the lower edges of the webs 35 terminate a suitable distance above the bottom 36, so that all of the chambers 42 are connected through the openings 41 in the webs. In this way the oil is permitted to circulate from one chamber to another at a rate restricted by the size of the openings 41.

Each chamber 42 (see Fig. 2) is divided by a vertical wall 43, in the form of an arcuate plate, which extends lengthwise of the chamber, and is anchored at each end to the webs 35. The lower edge of the wall 43 terminates a suitable distance above the bottom 36, as indicated at 44 (Fig. 1), and the upper edge of said wall projects above the normal level of the oil to provide a baffle.

The top of the bearing 25 is provided with a cover plate 54, which prevents dirt and other foreign matter from falling into the oil.

Surrounding the outer wall 34 of the bearing 25, and secured to the hub of the runner 23 so as to rotate therewith, is a cylindrical member 45 which constitutes a pan or receptacle for the oil. The bottom of the oil pan 45 is disposed beneath the bottom 36 of the bearing. Overlying the bottom of the oil pan is a plate 46 which covers the bolts used for fastening the shaft 24 and the oil pan 45 to the hub of the runner 23. In this way the oil will not be agitated by the revolving bolts.

The outer edge of the oil pan 45 extends upwardly a suitable distance and is provided with an inturned flange 47. As shown in Fig. 1, the flange 47 is disposed in the plane of the upper portion of the inclined openings 38, so as to provide means for deflecting the oil toward said openings.

A packing is provided between the outer wall of the oil pan 45 and the portion 31 of the housing 26. The portion 31 is formed with a sealing ring 48, and an annular packing gland 49 is fitted to the top of the portion 31, suitable packing material 50 being disposed in the space between the sealing ring and gland. If so desired the outer surface of the oil pan 45 which is engaged by the packing may be protected by a thin sheet of suitable material 51.

An opening 52 is formed in the bottom of the oil pan 45 for the purpose of draining oil from the pan, and a screw threaded plug 53 is provided for normally closing the opening.

Heretofore in the construction of hydraulic turbines, the packing was located beneath the bearing. With such construction, it was difficult to make inspections or renewals of the packing, due to the fact that such packings were inaccessible. However, by the present construction, it will be noted that the packing gland 49 is readily accessible through the openings in the upper portion 28 of the housing 26, so that any adjustments or renewals of the packing can be easily made without the necessity of dismantling any parts of the apparatus. This is an important feature of the invention which will be readily apparent to those skilled in the art.

Oil of sufficient quantity to submerge the main or central portion of the bearing 25 is maintained in the chamber provided by the oil pan 45. The oil is also contained in the chambers 42 of the bearing, through the connection between these chambers and the oil pan, provided by the grooves 33. Since the space between outer wall 34 of the bearing and the wall of the oil pan 45 is considerably less than the diameter of the main body portion of the bearing, a greater quantity of oil will be disposed within the bearing than in the chamber exterior thereof provided by the oil pan 45.

In operation, the revolving oil pan 45 produces a centrifugal action of the body of oil, and this action creates a suction action which draws the oil downwardly through the grooves 33 in the Babbitt lining 32. This results in the oil circulating in the paths indicated by the arrows (Fig. 1) in the following manner.

From the chamber at the bottom of the oil pan 45, the oil flows upwardly in the restricted space between the wall 34 and the wall of the oil pan. The upward movement of the oil is interrupted by the inwardly extending flange 47, which deflects the oil inwardly and downwardly toward the openings 38 in the bearing wall 34. The oil then flows through the openings 38 and into the chambers 42.

Since the walls 43 in the chambers 42 project above the normal level of the oil in said chambers, the oil will be prevented from flowing directly across the chambers 42 toward the shaft 24, and will consequently be directed downwardly through the outer portion of the chambers 42 and underneath the webs 35 and the walls 43 which divide these chambers and into the inner portions of the chambers. The oil then flows upwardly to the top of the central portion of the bearing 25 and from thence downwardly through the grooves 33, and to the bottom portion of the oil pan 45.

It will be apparent that the film of oil which flows down the runner shaft 24 will be heated and due to the small body of oil in the space between the wall of the oil pan 45 and the wall 34 of the bearing and also to the centrifugal action of the oil pan, the heat will not be dissipated from the oil when the oil flows upwardly toward the deflector provided by the flange 47. However, as the area of the chambers 42 is considerably greater than the area of the space between the outer wall of the bearing body and the oil pan, the quantity of oil in the chambers 42 will be greater than the amount of oil which is contained in the oil pan 45. Since the oil circulates at a comparatively slow rate through the chambers 42, the temperature of the oil entering said chambers will be lowered by the cooler oil therein. In this way the oil is maintained in the best possible condition during the operation of the turbine and positive circulation of the oil is provided for.

In another application for Letters Patent filed by me January 29, 1932, Serial No. 589,561, for improvements in Hydraulic turbines, I have claimed the manner in which the bearing and packing gland are arranged in the turbine.

While I have herein shown and described one preferred form of my invention by way of illustration I wish it to be understood that I do not limit or confine myself to the precise details of construction herein described and delineated as modification and variation may be made within the scope of the claims without departing from the spirit of the invention.

I claim:—

1. The combination with a rotatable shaft, of a bearing surrounding the shaft, said bearing having an external portion divided into a plurality of chambers for containing a quantity of oil, an oil pan surrounding said chambers and rotatable with the shaft, and means for directing oil from the oil pan into said chambers and from the chambers to said bearing.

2. The combination with a rotatable shaft, of a stationary bearing for the shaft, an annular portion surrounding the bearing and having a plurality of chambers communicating at the bottom, an oil pan surrounding the annular portion and rotatable with the shaft, and means for directing oil from the oil pan into the chambers.

3. The combination with a rotatable shaft, of a bearing surrounding the shaft, said bearing having inner and outer spaced side walls and a bottom wall, a series of openings formed in the outer wall near the top thereof, and a rotatable oil pan surrounding the bearing, said oil pan having a side wall extending above the openings in the side wall of the bearing, and means for deflecting oil from the oil pan toward the openings in the side wall of the bearing.

4. The combination with a rotatable shaft, of a bearing for the shaft, said bearing comprising an oil receptacle having an inner wall surrounding the shaft, an outer wall spaced from the inner wall, and a bottom wall connecting said inner and outer walls, an oil pan surrounding the bearing and rotatable with said shaft, and means carried by the oil pan for deflecting oil toward the bearing.

5. The combination with a rotatable shaft, of a bearing for the shaft comprising an oil receptacle having an inner wall surrounding the shaft, an outer wall spaced from the inner wall and a bottom wall connecting the inner and outer walls, the outer wall extending above the inner wall so that when the bearing is filled with oil the inner wall will be submerged, and means rotatable with the shaft and surrounding the bearing for continuously supplying the bearing with oil.

6. The combination with a rotatable shaft, of a bearing surrounding the shaft comprising a unitary structure having an inner wall for surrounding the shaft, an outer wall spaced from the inner wall, and a bottom wall connecting said inner and outer walls to provide an oil receptacle, a plurality of substantially radial partitions formed integral with the bearing body, a plurality of substantially circumferential partitions interposed between said radial partitions, said partitions providing a plurality of chambers, and openings at the bottom of said partitions for causing the oil to flow in a serpentine path through the bearing.

7. The combination with a shaft, of a bearing for the shaft comprising an oil receptacle having an inner wall surrounding the shaft, an outer wall spaced from the inner wall, and a bottom wall connecting said inner and outer walls, the outer wall being of greater height than the inner wall, a series of openings formed in the outer wall near the top thereof, partitions within the space between said inner and outer walls to provide a plurality of chambers, said partitions having openings for causing the oil to flow in a serpentine path through the bearing, an oil pan surrounding the bearing and rotatable with the shaft, and means carried by the oil pan for deflecting oil toward the openings in the outer wall of the bearing.

HARRY E. SMYSER.